United States Patent
Arena et al.

(10) Patent No.: US 9,961,324 B2
(45) Date of Patent: May 1, 2018

(54) METHOD FOR CODING AND DECODING A DIGITAL VIDEO, AND RELATED CODING AND DECODING DEVICES

(71) Applicants: RAI RADIOTELEVISIONE ITALIANA S.P.A., Rome (IT); S.I.SV.EL. SOCIETA' ITALIANA PER LO SVILUPPO DELL'ELETTRONICA S.P.A., None (IT)

(72) Inventors: Marco Arena, Turin (IT); Giovanni Ballocca, Turin (IT); Paola Sunna, Turin (IT)

(73) Assignees: RAI Radiotelevisione Italiana S.P.A., Rome (IT); S.I.SV.EL. Societa', Italiana Per Lo Sviluppo Dell'elettronica S.P.A. (IT)

( * ) Notice: Subject to any disclaimer, the term of this patent is extended or adjusted under 35 U.S.C. 154(b) by 259 days.

(21) Appl. No.: 14/435,408

(22) PCT Filed: Oct. 14, 2013

(86) PCT No.: PCT/IB2013/059349
§ 371 (c)(1),
(2) Date: Apr. 13, 2015

(87) PCT Pub. No.: WO2014/060937
PCT Pub. Date: Apr. 24, 2014

(65) Prior Publication Data
US 2015/0281669 A1  Oct. 1, 2015

(30) Foreign Application Priority Data
Oct. 15, 2012 (IT) .............................. TO2012A0901

(51) Int. Cl.
*H04N 13/00* (2018.01)
*H04N 19/597* (2014.01)
(Continued)

(52) U.S. Cl.
CPC ..... *H04N 13/0048* (2013.01); *H04N 13/0066* (2013.01); *H04N 19/132* (2014.11);
(Continued)

(58) Field of Classification Search
CPC ............................. H04N 7/26; H04N 13/0048
See application file for complete search history.

(56) References Cited

U.S. PATENT DOCUMENTS

2012/0042050 A1  2/2012  Chen et al.
2012/0106921 A1  5/2012  Sasaki et al.

FOREIGN PATENT DOCUMENTS

EP          1 524 859 A2   4/2005
TW         201220826 A1   5/2012
(Continued)

OTHER PUBLICATIONS

Taiwanese Office Action dated Aug. 24, 2015, issued in Taiwan Application No. TW 10421127080.
(Continued)

*Primary Examiner* — Sathyanaraya V Perungavoor
*Assistant Examiner* — Patricia I Young
(74) *Attorney, Agent, or Firm* — Workman Nydegger

(57) ABSTRACT

A method is described for generating a video stream by starting from a plurality of sequences of 2D and/or 3D video frames, wherein a video stream generator composes into a container video frame video frames coming from N different sources ($S_1$, $S_2$, $S_3$, $S_N$) and generates a single output video stream of container video frames which is coded by an encoder, wherein said encoder enters into the output video stream a signalling adapted to indicate the structure of the
(Continued)

container video frames. A corresponding method for regenerating the video stream is also described.

19 Claims, 23 Drawing Sheets

(51) Int. Cl.
    *H04N 19/70* (2014.01)
    *H04N 19/132* (2014.01)
    *H04N 19/156* (2014.01)
    *H04N 19/162* (2014.01)
    *H04N 19/164* (2014.01)
    *H04N 19/17* (2014.01)
    *H04N 19/44* (2014.01)

(52) U.S. Cl.
    CPC ......... *H04N 19/156* (2014.11); *H04N 19/162* (2014.11); *H04N 19/164* (2014.11); *H04N 19/17* (2014.11); *H04N 19/44* (2014.11); *H04N 19/597* (2014.11); *H04N 19/70* (2014.11)

(56) References Cited

FOREIGN PATENT DOCUMENTS

| TW | 201234833 A1 | 8/2012 |
| WO | 2008/054100 A1 | 5/2008 |
| WO | 2009/136681 A1 | 11/2009 |

OTHER PUBLICATIONS

International Search Report dated Mar. 4, 2014, issued in PCT Application No. PCT/162013/059349, filed Oct. 14, 2013.
Written Opinion dated Mar. 4, 2014, issued in PCT Application No. PCT/162013/059349, filed Oct. 14, 2013.

| 3D-video - Left eye | 3D-video - Right eye |
|---|---|
| Depth map associated to left eye | Depth map associated to right eye |

Figure 6

| Half 2D-video - Part 1 | Half 2D-video - Part 2 |
|---|---|
| 3D-video - Left eye | 3D-video - Right eye |

Figure 7

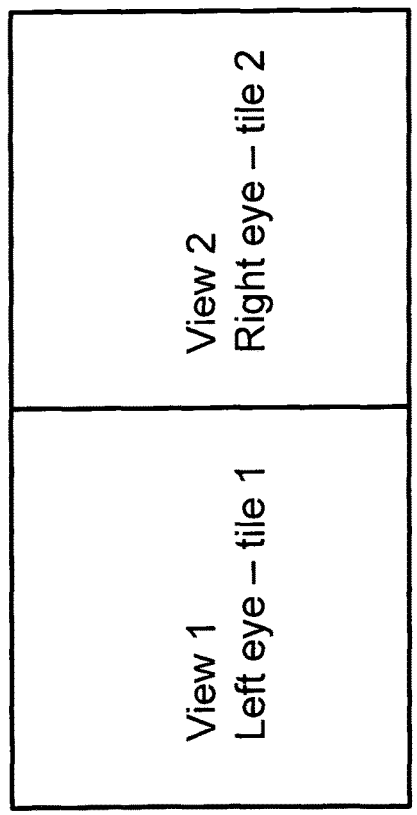
Figure 11
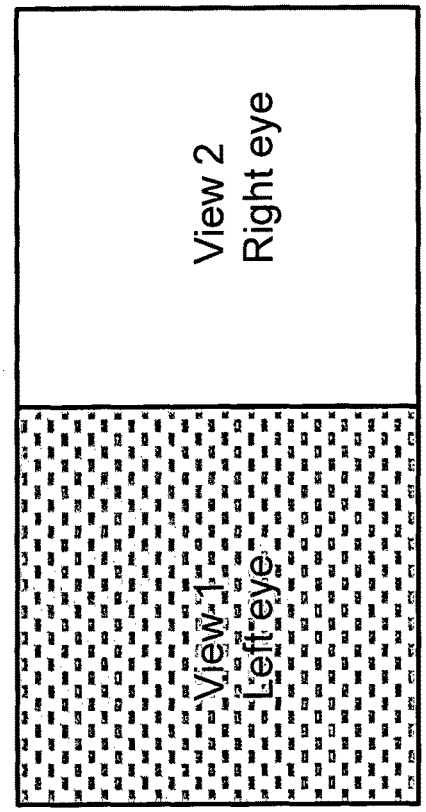
Figure 11 bis

| tile_descriptor (payloadSize) { | Descriptor |
|---|---|
| for (i = 0; i< (num_tile_columns_minus1 + 1) * (num_tile_rows_minus1 + 1); i++ ) | ue(v) |
| { | |
|     frame_packing_arrangement_type[i] | u(7) |
|     tile_content_relationship_bitmask[i] | ue(v) |
|     if (frame_packing_arrangement_type[i] != 6) | |
|     { | |
|         view_id[i] | ue(v) |
|     } | |
|     content_interpretation_type[i] | u(6) |
| } | |
| } | |

Fig. 12

| Value | Meaning |
|---|---|
| 0 | The tile contains no particular service. |
| 1 | The tile consists of the right portion of a video needing a further tile to be complete. For example, in the case of a 3D transmission, the tile represents the right view. |
| 2 | The tile consists of the left portion of a video needing a further tile to be complete. For example, in the case of a 3D transmission, the tile represents the left view. |
| 3 | The tile consists of a video containing two views of a 3D transmission. Since both views are comprised within the same tile, the value of frame_packing_arrangement_type provides an indication about the way in which the frame has been subdivided. The two frames making up the tile form the right view and the left view of a video in stereoscopic format, frame 0 being associated with the left view and frame 1 being associated with the right view (note that the frame numbering matches that of the H-264/AVC specification). |
| 4 | The tile consists of a video containing two views of a 3D transmission. Since both views are comprised within the same tile, the value of frame_packing_arrangement_type provides an indication about the way in which the frame has been subdivided. The two frames making up the tile form the right view and the left view of a video in stereoscopic format, frame 0 being associated with the right view and frame 1 being associated with the left view (note that the frame numbering matches that of the H-264/AVC specification). |
| 5 | The tile is a depth map associated with the view indicated by the variable tile_content_relationship_bitmask[i]. |

Fig. 13

| pic_parameter_set_rbsp( ) { | Descriptor |
|---|---|
| pic_parameter_set_id | ue(v) |
| seq_parameter_set_id | ue(v) |
| sign_data_hiding_flag | u(1) |
| cabac_init_present_flag | u(1) |
| num_ref_idx_l0_default_active_minus1 | ue(v) |
| num_ref_idx_l1_default_active_minus1 | ue(v) |
| pic_init_qp_minus26 | se(v) |
| constrained_intra_pred_flag | u(1) |
| transform_skip_enabled_flag | u(1) |
| cu_qp_delta_enabled_flag | u(1) |
| if ( cu_qp_delta_enabled_flag ) | |
|    diff_cu_qp_delta_depth | ue(v) |
| pic_cb_qp_offset | se(v) |
| pic_cr_qp_offset | se(v) |
| pic_slice_level_chroma_qp_offsets_present_flag | u(1) |
| weighted_pred_flag | u(1) |
| weighted_bipred_flag | u(1) |
| output_flag_present_flag | u(1) |

Fig. 14a

| | |
|---|---|
| transquant_bypass_enable_flag | u(1) |
| dependent_slice_enabled_flag | u(1) |
| tiles_enabled_flag | u(1) |
| entropy_coding_sync_enabled_flag | u(1) |
| entropy_slice_enabled_flag | u(1) |
| if( tiles_enabled_flag ) { | |
|    num_tile_columns_minus1 | ue(v) |
|    num_tile_rows_minus1 | ue(v) |
|    uniform_spacing_flag | u(1) |
|    if( !uniform_spacing_flag ) { | |
|      for( i = 0; i < num_tile_columns_minus1; i++ ) | |
|        column_width_minus1[ i ] | ue(v) |
|      for( i = 0; i < num_tile_rows_minus1; i++ ) | |
|        row_height_minus1[ i ] | ue(v) |
|    } | |
|    loop_filter_across_tiles_enabled_flag | u(1) |

Fig. 14b

| | |
|---|---|
| for (i = 0; i< (num_tile_columns_minus1 + 1) * (num_tile_rows_minus1 + 1); i++ ) | ue(v) |
| { | |
| frame_packing_arrangement_type[i] | u(7) |
| tile_content_relationship_bitmask[i] | ue(v) |
| if (frame_packing_arrangement_type[i] != 6) | |
| { | |
| view_id[i] | ue(v) |
| } | |
| content_interpretation_type[i] | u(6) |
| } | |
| } | |
| loop_filter_across_slices_enabled_flag | u(1) |
| deblocking_filter_control_present_flag | u(1) |

Fig. 14c

| | |
|---|---|
| if( deblocking_filter_control_present_flag ) { | |
|    deblocking_filter_override_enabled_flag | u(1) |
|    pps_disable_deblocking_filter_flag | u(1) |
|    if( !pps_disable_deblocking_filter_flag ) { | |
|       beta_offset_div2 | se(v) |
|       tc_offset_div2 | se(v) |
|    } | |
| } | |
| pps_scaling_list_data_present_flag | u(1) |
| if( pps_scaling_list_data_present_flag ) | |
|    scaling_list_data( ) | |
| log2_parallel_merge_level_minus2 | ue(v) |
| slice_header_extension_present_flag | u(1) |
| slice_extension_present_flag | u(1) |
| pps_extension_flag | u(1) |
| if( pps_extension_flag ) | |
|    while( more_rbsp_data( ) ) | |
|       pps_extension_data_flag | u(1) |
| rbsp_trailing_bits( ) | |
| } | |

Fig. 14d

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| chroma_format_idc | ue(v) |
| if( chroma_format_idc == 3 ) | |
| separate_colour_plane_flag | u(1) |
| max_temporal_layers_minus1 | u(3) |
| pic_width_in_luma_samples | ue(v) |
| pic_height_in_luma_samples | ue(v) |
| pic_cropping_flag | u(1) |
| if( pic_cropping_flag ) { | |
| pic_crop_left_offset | ue(v) |
| pic_crop_right_offset | ue(v) |
| pic_crop_top_offset | ue(v) |
| pic_crop_bottom_offset | ue(v) |
| } | |
| bit_depth_luma_minus8 | ue(v) |
| bit_depth_chroma_minus8 | ue(v) |

Fig. 15a

| | |
|---|---|
| [Ed. (BB): chroma bit depth present in HM software but not used further ] | |
| pcm_enabled_flag | u(1) |
| if( pcm_enabled_flag ) { | |
|     pcm_bit_depth_luma_minus1 | u(4) |
|     pcm_bit_depth_chroma_minus1 | u(4) |
| } | |
| qpprime_y_zero_transquant_bypass_flag | u(1) |
| log2_max_pic_order_cnt_lsb_minus4 | ue(v) |
| for( i = 0; i <= max_temporal_layers_minus1; i++ ) { | |
|     max_dec_pic_buffering[ i ] | ue(v) |
|     num_reorder_pics[ i ] | ue(v) |
|     max_latency_increase[ i ] | ue(v) |
| } | |
| restricted_ref_pic_lists_flag | u(1) |
| if( restricted_ref_pic_lists_flag ) | |
|     lists_modification_present_flag | u(1) |

Fig. 15b

| | |
|---|---|
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if( pcm_enabled_flag ) { | |
|    log2_min_pcm_coding_block_size_minus3 | ue(v) |
|    log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | |
| chroma_pred_from_luma_enabled_flag | u(1) |
| deblocking_filter_in_aps_enabled_flag | u(1) |
| seq_loop_filter_across_slices_enabled_flag | u(1) |
| asymmetric_motion_partitions_enabled_flag | u(1) |
| nsrqt_enabled_flag | u(1) |
| sample_adaptive_offset_enabled_flag | u(1) |
| adaptive_loop_filter_enabled_flag | u(1) |

Fig. 15c

| | |
|---|---|
| if( adaptive_loop_filter_enabled_flag ) | |
|    alf_coef_in_slice_flag | u(1) |
| if( pcm_enabled_flag ) | |
|    pcm_loop_filter_disable_flag | u(1) |
| temporal_id_nesting_flag | u(1) |
| [Ed. (BB): x y padding syntax missing here, present in HM software ] | |
| if( log2_min_coding_block_size_minus3 = = 0 ) | |
|    inter_4x4_enabled_flag | u(1) |
| num_short_term_ref_pic_sets | ue(v) |
| for( i = 0; i < num_short_term_ref_pic_sets; i++) | |
|    short_term_ref_pic_set( i ) | |
| long_term_ref_pics_present_flag | u(1) |
| tiles_or_entropy_coding_sync_idc | u(2) |
| if( tiles_or_entropy_coding_sync_idc = = 1 ) { | |
|    num_tile_columns_minus1 | ue(v) |
|    num_tile_rows_minus1 | ue(v) |
|    uniform_spacing_flag | u(1) |
|    if( !uniform_spacing_flag ) { | |
|       for( i = 0; i < num_tile_columns_minus1; i++ ) | |

Fig. 15d

| | |
|---|---|
| column_width[ i ] | ue(v) |
| for( i = 0; i < num_tile_rows_minus1; i++ ) | |
| row_height[ i ] | ue(v) |
| } | |
| loop_filter_across_tiles_enabled_flag | u(1) |
| } | |
| multiservice_flag | ue(v) |
| if (multiservice_flag) { | |
| num_tiles | u(7) |
| for (i = 0; i<num_tiles; i++ ) | ue(v) |
| { | |
| frame_packing_arrangement_type[i] | |
| tile_content_relationship_bitmask[i] | ue(v) |
| if (frame_packing_arrangement_type[i] != 6) | |
| { | u(6) |
| view_id[i] | |
| } | |
| content_interpretation_type[i] | u(1) |
| } | |
| } | |

Fig. 15e

| | |
|---|---|
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Fig. 15f

METHOD FOR CODING AND DECODING A DIGITAL VIDEO, AND RELATED CODING AND DECODING DEVICES

BACKGROUND OF THE INVENTION

1. Field of the Invention

The present invention relates to a method for coding and decoding a digital video, in particular a method for coding a video stream into independent partitions, and to a corresponding method for independently decoding one or more partitions making up the video stream.

The present invention also relates to a device for coding a video stream into independent partitions and to a device for independently decoding one or more of said partitions.

2. Present State of the Art

The coding and distribution of independent video streams representing different views of the same event or of a mosaic of multimedia services (multiview video—Free-to-View Video) have long been known. Distributing such multiview videos to users typically requires coding a number of independent video streams matching the number of generated views.

A coding and decoding method of this kind is described for example, in document "ISO/IEC 13818-1: 2000 (E)—Information technology—Generic coding of moving pictures and associated audio information: Systems", or in document "ISO/IEC 14496-10 Information technology—Coding of audio-visual objects Part 10: Advanced Video Coding" and in the corresponding document "ITU-T H.264—Advanced video coding for generic audiovisual services", hereafter referred to as H.264/AVC specification. The coding methods currently in use have several drawbacks, such as: the necessity of using a number of video encoders equal to the number of video components to be distributed; the mutual difficult synchronization among the video streams being distributed and between the video streams and the corresponding audio streams; the increased band required for transporting the video streams, due to the need for replicating similar signalling elements required for decoding each independent stream. On the other hand, the corresponding decoding methods require the use of multiple decoders for decoding and displaying two or more views being transmitted, leading to higher complexity and cost of the user terminals' architecture.

It is also known that a single video stream can be used for distributing multiple independent views, as is the case, for example, of the so-called "mosaic" services, wherein the single frame is constituted by n frames extracted from independent videos and composed into one image, or by the two component videos of a 3D stereoscopic pair composed into a single frame (the so-called "Frame Packing Arrangement" or "frame compatible format"). Such composite videos are typically compressed by using any one of the available compression techniques, such as, for example, MPEG-2, H.264/AVC, HEVC. Such compression techniques provide no tools allowing a specification-compliant decoder to independently decode one or more of the component video streams. Methods have been developed which allow a 2D decoder to extract from the decoded video only one of the two component views of the stereoscopic pair, but these methods rely on the use of a suitable signalling that allows the decoder, once the entire container frame has been decoded, to cut and display a frame area containing only one of the two views.

It is currently impossible to code the video in such a way as to enable a decoder (upon user selection or due to limited computational or storage resources) to decode only a chosen subset of the whole frame. For example, it is not possible to code a video containing one of the above-mentioned Frame Packing Arrangements in a manner such that a 2D decoder, which is not interested in both images making up the stereoscopic pair, can decode and display only the region corresponding to one of the two views (e.g., the left one).

This implies wasting computational and energetic resources. It should be noted that this problem is especially felt in the field of mobile terminals, where any undue utilization of computational resources can drastically shorten the battery life.

Furthermore, a decoder may be used in a device such as a set-top box or a smart gateway, to which one or more displays, not necessarily having homogeneous characteristics, can be connected. Let us consider, for example, the case of a smart gateway receiving a coded video stream from a distribution network (e.g., an IP network or a broadcasting network) or reading the stream from a storage device. To said smart gateway a plurality of displays can be connected, through cables and/or wireless connections, which may have different characteristics (e.g., HD display or tablet). In such a case, the decoder should be able to adapt the decoded video to the characteristics of the display(s) to be served: if just one display with lower resolution than the decoded video is connected to the decoder, the latter should be able to decode only that part of the video which is most relevant for the terminal involved.

Besides, the current techniques only allow to automatically identify one of the component video streams (as in the above stereoscopic pair example), so that it is impossible to expressly indicate to the decoder the presence of the additional one or more component video streams. A "default" choice is thus imposed on the decoder with less resources, and the presence of alternative contents cannot be indicated.

Moreover, the possibility of coding a single video stream, besides allowing to scale the utilization of computational resources during the decoding process, also allows to code a single video stream in order to serve, according to different service models, terminals characterized by different availability in terms of storage and computational resources. For example, it is conceivable to code the composition of 4 HD videos (1920×1080 pixel) as a single 4k (3840×2160 pixel) video stream: of such a video, a decoder with limited computational resources might decode a subset containing just one of the HD components; alternatively, a more powerful decoder might decode the entire 4K video and, for example, display the whole mosaic of contents.

SUMMARY OF THE INVENTION

It is one object of the present invention to define a coding method that allows coding into a single container video stream one or more different component video streams, so that at least one of the latter can be decoded independently of the others.

It is another object of the present invention to specify a decoding method which allows one or more component video streams to be independently decoded from a single container video stream through the use of a single decoder.

It is a further object of the present invention to provide an encoder which codes a container video stream made up of multiple component video streams, so as to allow one or more component video streams to be independently decoded.

It is yet another object of the present invention to provide a decoder that independently decodes at least one of a plurality of component video streams coded as a single container video stream.

BRIEF DESCRIPTION OF THE DRAWINGS

These and further aspects of the present invention will become more apparent from the following description, which will illustrate some embodiments thereof with reference to the annexed drawings, wherein:

FIG. 6 shows a composition of a stereoscopic video stream and the associated depth maps into a single container video stream;

FIG. 7 shows a composition of a 2D video stream and a stereoscopic video stream into a single container video stream;

FIGS. 11 and 11b is show the composition of two views of a stereoscopic video stream into a single container video stream;

FIG. 12 is a table that describes a structure of a signalling to be entered into a coded video stream;

FIG. 13 is a table containing possible values of a parameter of the structure of FIG. 12;

FIGS. 14a-14d show a table with modifications to the syntax of the PPS of the HEVC standard, which are required for entering the signalling of FIG. 12;

FIGS. 15a-15f show a table with modifications to the syntax of the SPS of the HEVC standard, which are required for entering the signalling of FIG. 12.

DETAILED DESCRIPTION OF THE PREFERRED EMBODIMENTS

Figure 1:
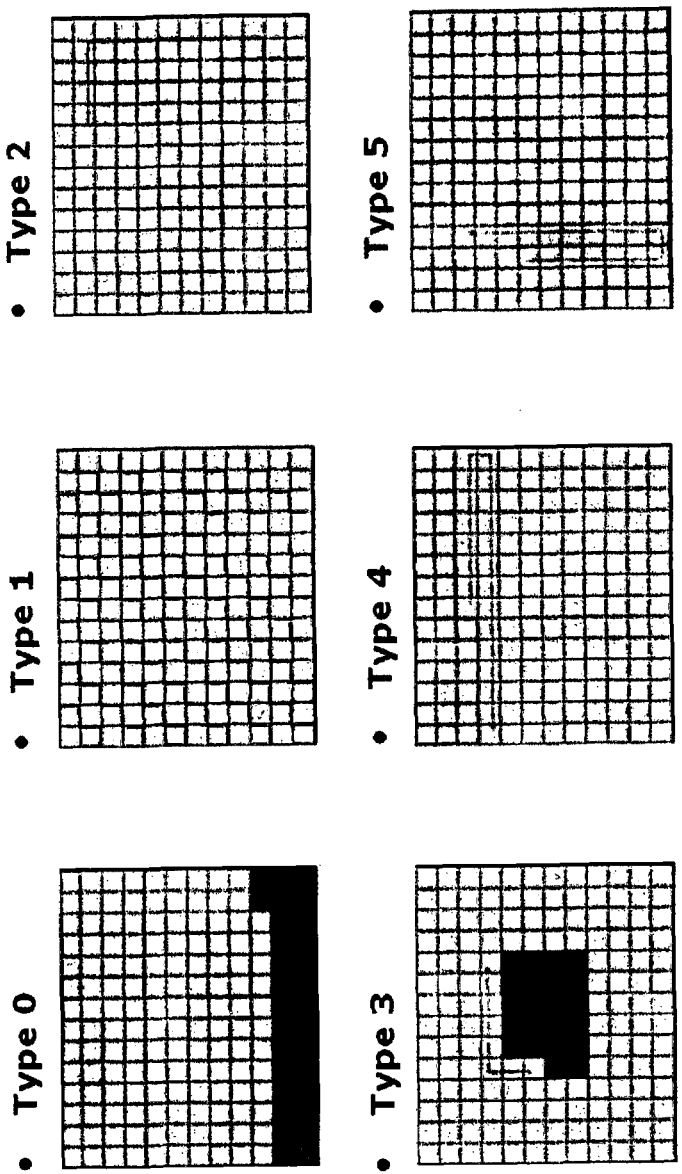
FIG. 1 shows an image to be coded partitioned into groups of macroblocks ("slices") in accordance with the H.264/AVC specification.

The existing video coding standards, as well as those currently under definition, offer the possibility of partitioning the images that constitute digital video streams for the purpose of optimizing the coding and decoding processes. As shown in FIG. 1, the H.264/AVC specification allows creating groups of macroblocks, wherein the images to be coded are subdivided into different types of groups, called slices, which are then coded independently of one another. For example, as shown in FIG. 1 in regard to the subdivision called "Type 2", the macroblocks can be grouped into slices having an arbitrary shape, so as to allow the quality of the coded video to be selectively varied as a function of the position of any "regions of interest".

Figure 2:
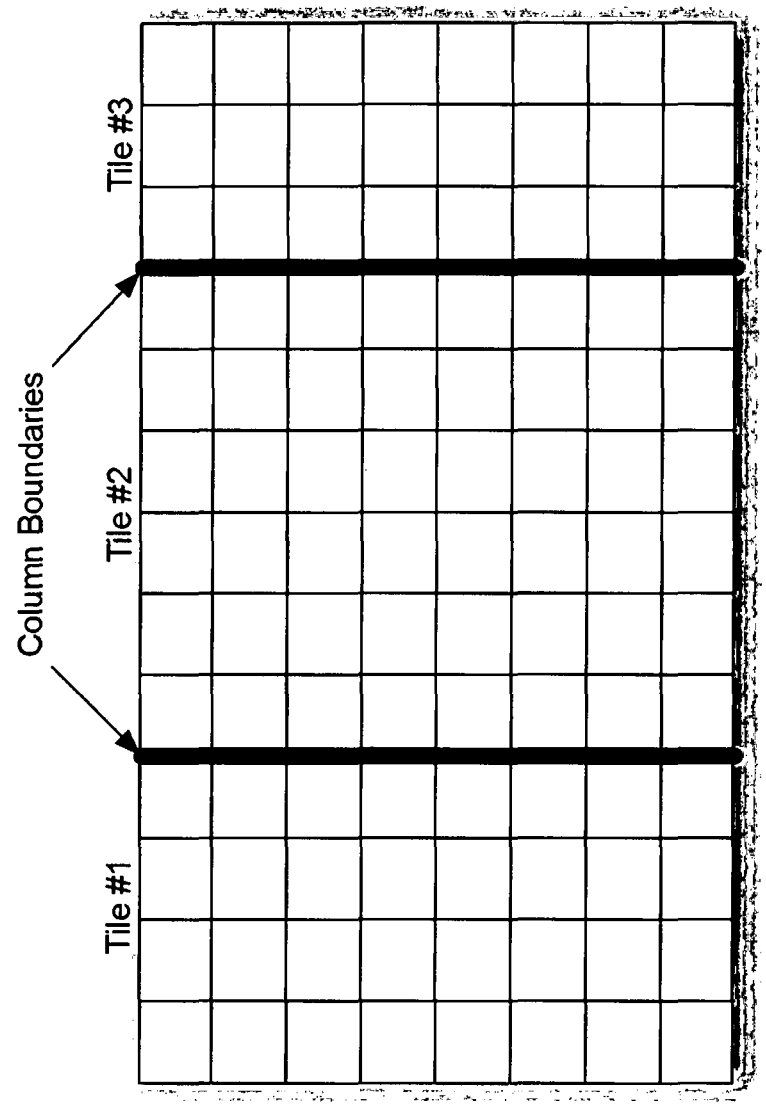
FIG. 2 shows an image to be coded partitioned into "tiles" in accordance with the HEVC specification.

Instead, FIG. 2 shows a new type of image subdivision, called "tile", which has been introduced into the specification of the new ITU/ISO/IEC HEVC (High Efficiency Video Coding) standard. This type of subdivision, based on the slice structure already existing in the H.264/AVC specification, has been introduced in order to allow parallelization of the video stream coding and decoding processes: the increasing spread and lower costs of parallel graphic processors (the so-called GPU's, Graphics Processing Units), which are now available even on mobile terminals such as telephones and PC tablets, have promoted the introduction of parallelization support tools which allow image formats to be brought to very high resolutions even on terminals typically having limited computational resources.

The HEVC specification has defined tiles in such a way as to allow the images that constitute the video stream to be segmented into regions and to make the decoding thereof mutually independent. The decoding process, however, even when parallelized, is still carried out for the entire image only, and the segments cannot be used independently of one another.

As aforementioned in the above paragraphs, it would be useful to be able to partition the video stream in such a way that different terminals can decide, automatically or upon instructions received from the user, which parts of the video should be decoded and sent to the display for visualization.

FIGS. 3, 4, 6 and 7 illustrate different utilization scenarios where this kind of partitioning might prove useful.

Figure 3:
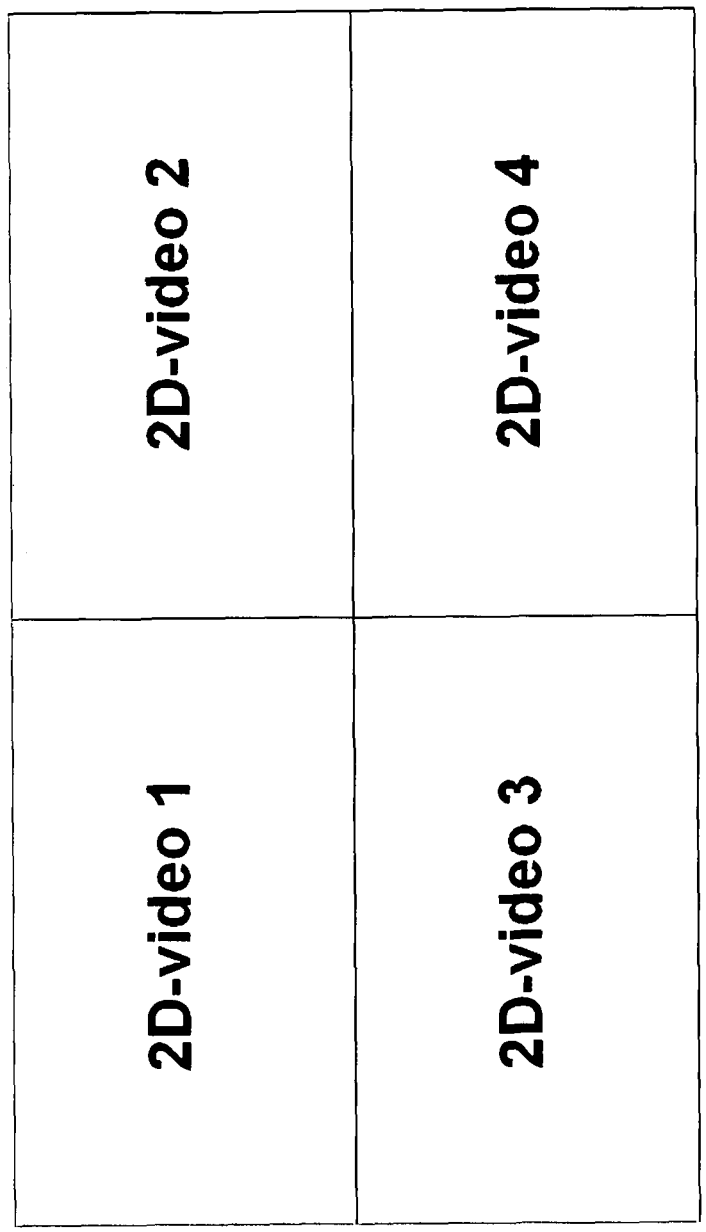
FIG. 3 shows an example of composition of four independent 2D video streams into a single video stream.

FIG. 3 shows a container video stream which, for example, may be in the 4K (3840×2160 pixel) format and may contain four independent HD (1920×1080 pixel) videos. A user equipped with a 4K decoder may decode and display the entire video, while a user equipped with a less powerful decoder may limit the decoding to a single HD stream at a time.

Figure 4:
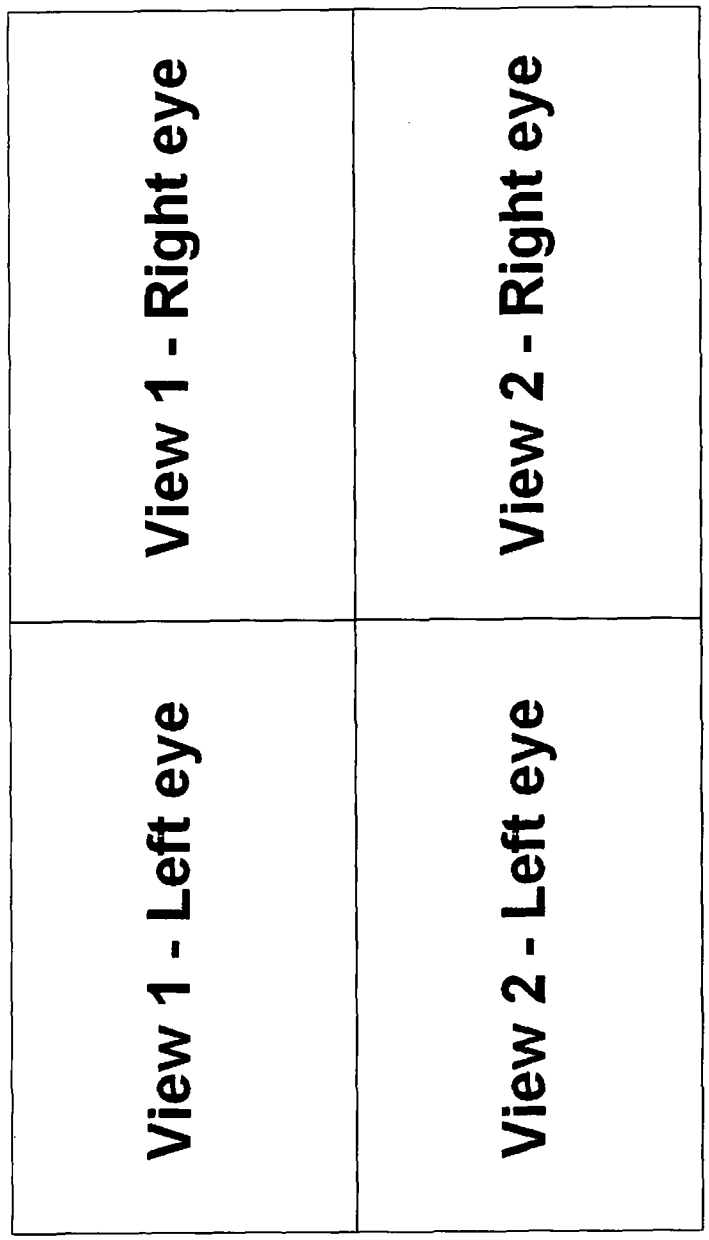
FIG. 4 shows the composition of two independent stereoscopic video streams, in the form of 2D video pairs, into a single video stream.

FIG. 4 shows the transportation, as a single container video stream, of two stereoscopic video streams (in the form of two independent Left and Right video pairs), e.g., representing two different stereoscopic views of the same event, from which the user can choose the preferred view without necessarily having to decode the whole frame (with obvious implications in terms of energy consumption).

Figure 5:
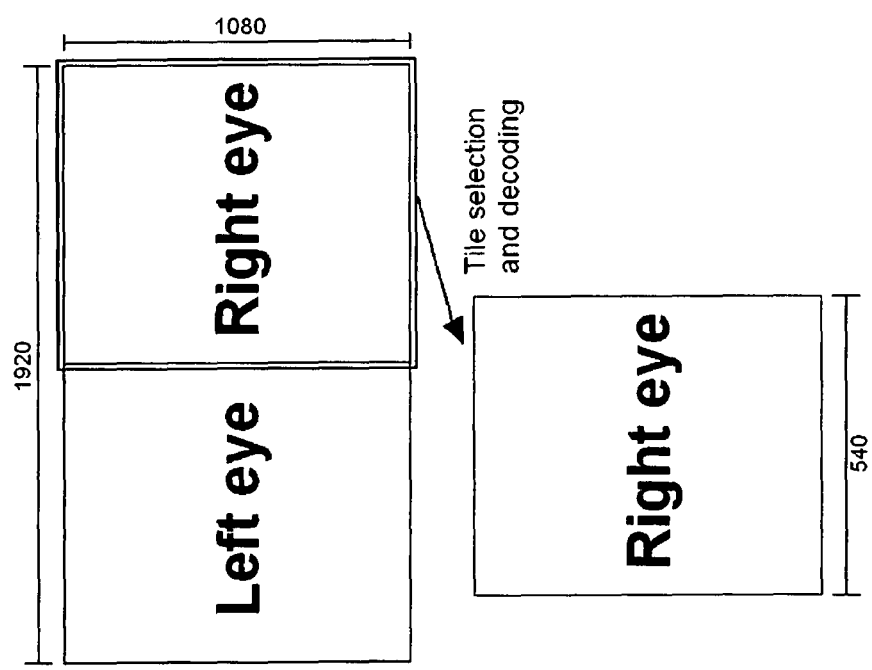
FIG. 5 shows a process for selectively decoding one of the two images that constitute the stereoscopic pair, coded as a single video stream.

FIG. 5 shows the composition of a stereoscopic video and the associated depth maps into a single video stream. In this case, a decoder of a stereoscopic television set may decode only the part relating to the two images of the stereoscopic pair, located in the upper half of the image; the lower part will thus not be decoded. Instead, a decoder of a auto-stereoscopic television set using the well-known 2D+Z technique (construction of synthetic views from a single image plus the associated depth map) might, for example, decode only the left half of the image, whereas the decoder of a more sophisticated auto-stereoscopic decoder may use both views and both depth maps to synthesize the intermediate views.

FIG. 7 shows the composition of a dual-resolution 2D video (e.g., intended for a display in 21:9 format), located in the upper half of the image, and the corresponding stereoscopic view in side-by-side format in the lower region.

The tile structure described in the HEVC specification is not sufficient to allow a decoder to properly recognize and decode the content transported by the container video. This problem can be solved by entering a suitable level of signalling describing which content is being transported in each one of the independently decodable regions and how to proceed in order to properly decode and display it.

At least two different scenarios can be foreseen. In the first one, it is necessary to indicate the association between the single contents and at least one of the tiles into which the image has been disassembled, and its possible reassembly into a coherent video stream (for example, as shown in FIG. 11, a stereoscopic video stream might be subdivided into two tiles and, while a 2D decoder must be informed about the possibility of decoding one single tile, a 3D decoder might not adopt any specific strategy and decode the entire stream). In the second scenario, instead, it is indicated the association between the single contents and each one of the tiles into which the image has been disassembled, and its possible reassembly into a coherent video stream (for example, a stereoscopic video stream may be subdivided into two tiles and, while a 2D decoder must be informed about the possibility of decoding one single tile, a 3D decoder must be informed about the necessity of decoding the entire stream).

The proposed solution provides for entering a descriptor which indicates, for at least one of the tiles, one or more specific characteristics: for example, it must be possible to signal if the content is a 2D one or, in the case of a stereoscopic content, the type of frame packing arrangement thereof. Furthermore, it is desirable to indicate any "relationships" (joint decoding and/or display) between tiles; the view identifier (to be used, for example, in the case of multiview contents) and a message stating whether the view in question is the right view or the left view of a stereoscopic pair, or a depth map. By way of example, the solution is illustrated as pseudo code in the table of FIG. 12, which describes the structure of the signalling to be entered into the coded video stream by using the data structures already employed in the H.264/AVC and HEVC specifications. It is nonetheless possible to adopt analogous signalling structures allowing the content of one or more tiles to be described in such a way as to allow a decoder to decode them appropriately.

Frame_packing_arrangement_type is an index that might correspond, for example, to the values commonly used in the MPEG2, H.264/AVC or SMPTE specifications, which catalogue the currently known and used stereoscopic video formats.

Tile_content_relationship_bitmask is a bitmask that univocally describes, for each tile, its association with the other tiles into which the coded video stream has been subdivided.

Content_interpretation_type provides the information necessary for interpreting the content of each tile. An example is specified in the table of FIG. 13.

With reference to the above case, wherein a stereoscopic video is coded as two tiles, in order to ensure the decoding of just one view by a 2D decoder the following information will be associated with the tile 0:
 frame_packing_arrangement_type[0]=3
 tile_content_relationship_bitmask[0]=11
 view_id[0]=0
 content_interpretation_type[0]=2

It should be noted that this type of signalling might be used together with or instead of other tools, such as, for example, the cropping rectangle. The cropping rectangle technique, according to which it is mandatory to crop the part of the decoded frame inside a rectangle signalled by means of suitable metadata, is already commonly used for making "3D compatible" a stereoscopic video stream in the form of one of the frame packing arrangements that require the stereoscopic pair to be entered into a single frame. FIG. 11b is illustrates, for example, a frame containing the so-called "side-by-side" frame packing arrangement, wherein only the left view (the gray one in figure) is contained in the cropping rectangle. Without tile partitioning, a 2D decoder should decode the whole frame, then apply the cropping and discard the right view (the white one in FIG. 11b is). By using the method of the invention, it is instead possible to code and signal the two views as separate tiles, thereby allowing a 2D decoder to decode just the area contained in the cropping rectangle.

Assuming, for example, that the video stream has been divided into four tiles, as shown in FIG. 4, the relationship among the tiles would be described by the following values:
 frame_packing_arrangement_type[0]=3
 frame_packing_arrangement_type[1]=3
 frame_packing_arrangement_type[2]=3
 frame_packing_arrangement_type[3]=3
 tile_content_relationship_bitmask[0]=1100
 tile_content_relationship_bitmask[1]=1100
 tile_content_relationship_bitmask[2]=0011
 tile_content_relationship_bitmask[3]=0011
 view_id[0]=0
 view_id[1]=0
 view_id[2]=1
 view_id[3]=1
 content_interpretation_type[0]=2
 content_interpretation_type[1]=1
 content_interpretation_type[2]=2
 content_interpretation_type[3]=1

This signalling indicates to the decoder that tiles 0 and 1 belong to the same 3D video content (tile_content_relationship_bitmask=1100) in side-by-side (frame_packing_arrangement_type=3). The value of tile_content_relationship_bitmask allows the decoder to know that the two views (which belong to the same stereoscopic pair because tile view_id=0 for both tiles) are contained in different tiles (and hence, in this case, at full resolution). Content_interpretation_type allows to understand that tile 0 corresponds to the left view, while tile 1 corresponds to the right view.

The same considerations apply to tiles 1 and 2.

The arrangement of FIG. 6, instead, is described by the following signalling:
 frame_packing_arrangement_type[0]=3
 frame_packing_arrangement_type[1]=3
 frame_packing_arrangement_type[2]=6
 frame_packing_arrangement_type[3]=6
 tile_content_relationship_bitmask[0]=1111
 tile_content_relationship_bitmask[1]=1111
 tile_content_relationship_bitmask[2]=1010
 tile_content_relationship_bitmask[3]=0101
 view_id[0]=1
 view_id[1]=1
 content_interpretation_type[0]=2
 content_interpretation_type[1]=1
 content_interpretation_type[2]=5
 content_interpretation_type[3]=5

Unlike FIG. 4, tile_content_relationship_bitmask is 1111 for tiles 0 and 1. This means that there is a relationship among all tiles. In particular, tiles 2 and 3 are 2D contents (frame_packing_arrangement_type=6) containing a depth map (content_interpretation_type=5) respectively associated with tile 0 (tile_content_relationship_bitmask=1010) and with tile 1 (tile_content_relationship_bitmask=0101)

In the syntax of the HEVC specification, this type of signalling could be easily coded as a SEI (Supplemental Enhancement Information) message: application information which, without altering the basic coding and decoding mechanisms, allows the construction of additional functions concerning not only the decoding, but also the next visualization process. As an alternative, the same signalling could be entered into the Picture Parameter Set (PPS), a syntax element that contains information necessary for decoding a dataset corresponding to a frame. The table of FIGS. 14a-14d includes, highlighted in bold, the modifications, in the form of pseudo code, that need to be made to the syntax of the PPS of the HEVC standard in order to enter the above-mentioned signalling.

A further generalization might provide for entering the signalling into the Sequence Parameter Set (SPS): a syntax element that contains information necessary for decoding a dataset corresponding to a consecutive sequence of frames.

The table of FIGS. 15a-15f includes, highlighted in bold, the modifications, in the form of pseudo code, that need to be made to the syntax of the SPS of HEVC in order to enter the above-mentioned signalling, wherein multiservice_flag is a variable that informs about the presence of multiple services within each tile and num_tile is the number of tiles within one frame.

FIG. 5 illustrates the selective tile decoding process. The video stream contains a pair of stereoscopic views, coded into two separate tiles.

The latter are described by the same signalling used for representing the content of FIG. 4 (in this case, however, the total number of tiles is 2).

Figure 8:
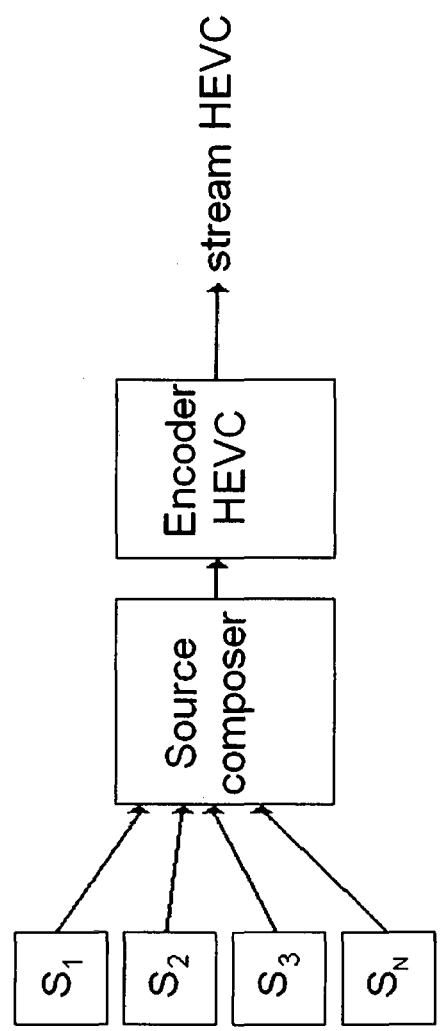
FIG. 8 is a block diagram of the process for composing and coding the video stream generated by composition of n independent video streams.

FIG. 8 is a block diagram of an apparatus or a group of apparatuses that can implement the coding technique of the present invention. N video contents $S_1$-$S_N$ are inputted to a "source composer". The "source composer" may be a separate component or may be integrated as an input stage of a suitable encoder. The source composer composes the container video stream that transports the N component video streams, and then outputs it towards an encoder. The source composer may optionally add the signalling required for describing to the encoder the format of the component video streams and their positions within the container video stream.

An encoder receives the container video stream, constructs the tiles in such a way as to map them onto the structure of the single component video streams, generates the signalling describing the tiles, the structure of the component video streams and their relationships, and compresses the container video stream. If the "source composer" does not automatically generate the signalling that describes the component video streams, the encoder can be programmed manually by the operator. The compressed video stream outputted by the encoder can then be decoded in different ways, i.e., by selecting independent parts depending on the functional characteristics and/or computational resources of the decoder and/or of the display it is connected to. The audio of each component video stream can be transported in accordance with the specifications of the System Layer part adopted for transportation.

A 2D decoder analyzes the bitstream, finds the signalling of the two tiles containing the two views, and decides to decode a single tile, displaying only one image compatible with a 2D display. A 3D decoder, instead, will decode both tiles and will proceed with stereoscopic visualization on a 3D display.

Figure 9:
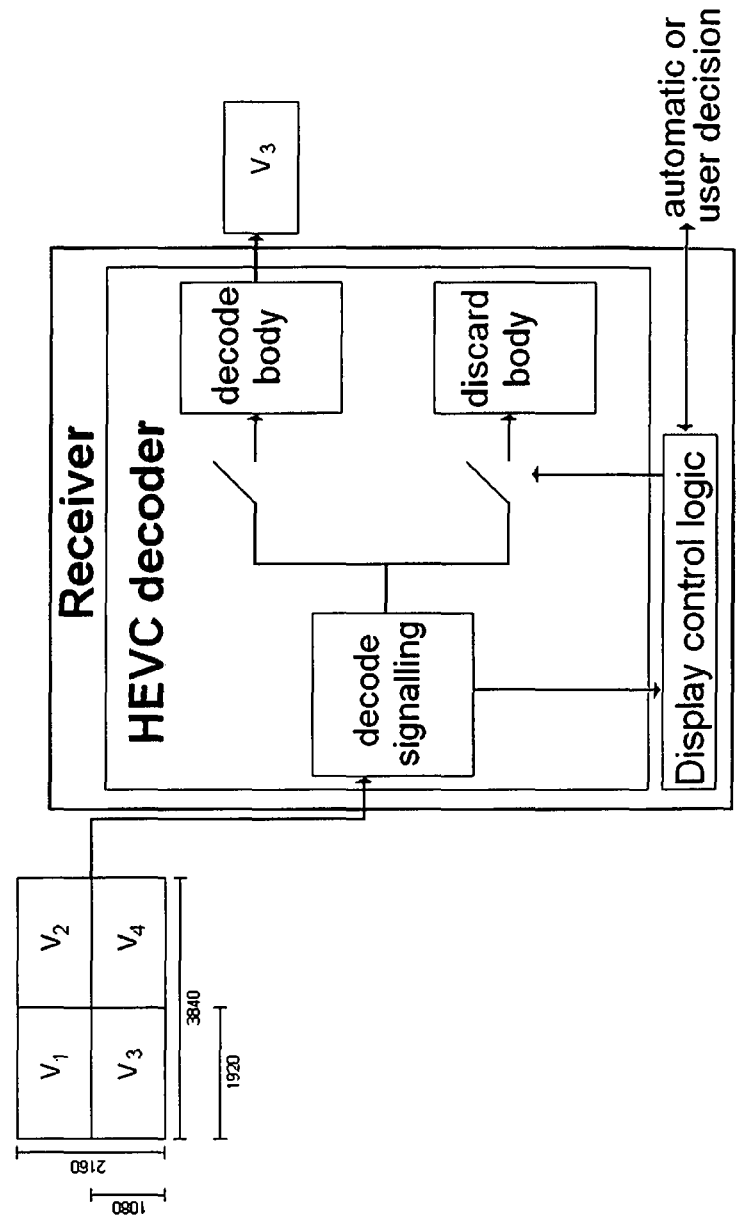
FIG. 9 shows an example of a method for decoding a video stream generated by the coding apparatus described in FIG. 8.

Similarly, FIG. 9 shows a decoder which, when connected to the display, negotiates the characteristics (e.g., the resolution) of the video to be displayed and decides accordingly, in an autonomous manner, which part of the video stream is to be decoded. This decision might also be dictated by the manual intervention of a user: for example, in the event that the video being transmitted is a stereoscopic video coded into two tiles, and assuming that the user, although equipped with a 3D television set, wants nevertheless to watch that content in 2D format (such a decision may be manifested by pressing a specific remote control key), the decoder may adopt a different decoding strategy than the one it would have adopted automatically while negotiating the best display format with the television set.

Figure 10:
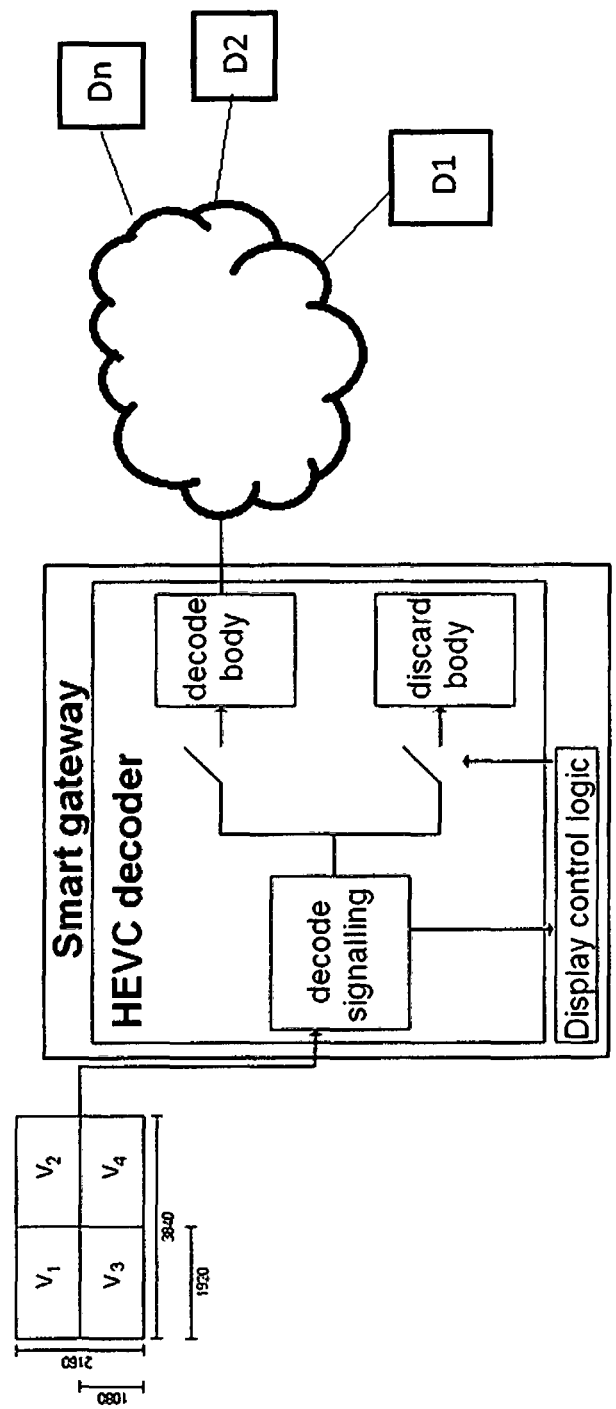
FIG. 10 shows a further method for decoding a video stream generated by a coding apparatus according to FIG. 8.

FIG. 10 shows, instead, the case wherein the decoder is located inside a gateway that receives the coded stream and must serve heterogeneous terminals, characterized by the possibility of supporting different formats of the video content (e.g., some devices may have the ability of displaying stereoscopic contents, while, at the same time, other devices might only have a 2D display). The gateway automatically negotiates with or receives configuration instructions from each device, and then decodes one or more parts of the input content in such a way as to adapt them to the characteristics of each requesting device.

Therefore, the present invention relates to a method for generating a video stream by starting from a plurality of sequences of 2D and/or 3D video frames, wherein a video stream generator composes into a container video frame video frames coming from N different sources $S_1$, $S_2$, $S_3$, $S_N$. Subsequently, an encoder codes the single output video stream of container video frames by entering into it a signalling adapted to indicate the structure of the container video frames.

The invention also relates to a method for regenerating a video stream comprising a sequence of container frames, each one comprising a plurality of 2D and/or 3D video frames coming from N different sources $S_1$, $S_2$, $S_3$, $S_N$. A decoder reads a signalling adapted to indicate the structure of the container video frames, and regenerates a plurality of video streams by extracting at least one or a subset of the plurality of video frames by decoding only those portions of the container video frames which comprise those video frames of the plurality of 2D and/or 3D video frames of the video streams which have been selected for display.

The invention claimed is:

1. A method for generating a digital video stream in a video stream generator comprising a video stream receiver unit and a video encoder, wherein the video stream generator generates a container video stream containing a plurality of independently encoded regions, the method comprising:
   receiving by said video stream receiver unit three or more component video streams from a plurality of video sources;
   mapping said three or more component video streams to three or more independently decodable regions;
   entering by said video encoder a signalling indicating a presence of corresponding three or more independently decodable regions,
   entering by said video encoder a signalling indicating an association between each of said three or more component video streams and each of said three or more independently decodable regions, whereby any of said three or more component regions can be associated with any of said three or more independently decodable regions in an independent way, and
   outputting a digital video stream comprising said signalling.

2. The method according to claim 1, further comprising entering by said video encoder a descriptor into said digital video stream indicating a type of content of said three or more component video streams.

3. The method according to claim 1, wherein each one of three or more independently decodable regions is coded by said video encoder as a tile.

4. The method according to claim 1, wherein a coding technique employed by said video encoder is H.264/AVC or HEVC.

5. The method according to claim 1, wherein the signalling entered by said video encoder into the digital video stream indicating the association between the three or more component regions and the three or more independently decodable regions and the descriptor indicating a type of content of the three or more component regions is an SEI message.

6. The method according to claim 1, wherein the signalling indicating the association between the three or more component regions and the three or more independently decodable regions and the descriptor indicating a type of content of the three or more component regions is entered by said video encoder into an SPS signalling or into a PPS signalling.

7. The method according to claim 1, wherein the signalling entered by said video encoder into the digital video stream indicating the association between the three or more component regions and the three or more independently decodable regions includes a bitmask.

8. The method according to claim 1, wherein the three or more component regions of the digital video stream represent one or more independent video streams.

9. The method according to claim 8, wherein the one or more video streams include one or more of the following formats:
one or more stereoscopic video pairs;
video streams and depth maps;
one or more video streams in the frame packing arrangement format;
mosaic of independent videos.

10. The method according to claim 2, wherein the descriptor comprises one or more metadata describing:
Frame packing arrangement;
Content interpretation type;
View ID.

11. A method for decoding an encoded digital video stream including a three or more independent component regions in a video decoder comprising a signalling decoder and a video data decoder, the method comprising:
reading by said signalling decoder a signal indicating a presence of three or more independently decodable regions;
reading by said signalling decoder a signalling comprised in said digital video stream indicating an association between each of said three or more independent component regions and each of said three or more independently decodable regions, wherein said three or more independent component regions are originated by a plurality of video sources and wherein any of said three or more component regions can be associated with any of said three or more independently decodable regions in an independent way;
reading by said signaling decoder a descriptor comprised in said digital video stream indicating a type of content of each one of the three or more independently decodable regions;
selecting for decoding a set of the three or more independently decodable regions indicated by said signalling or by said descriptor, and
decoding said selected set of independently decodable regions by said video decoder and outputting the decoded video stream obtained by said video data decoder for displaying.

12. The method according to claim 11, wherein said video decoder selects one or more of the three or more independently decodable regions based on an evaluation of its own computational resources.

13. The method according to claim 11, wherein one or more of the three or more independently decodable regions are made available for display on a single display.

14. The method according to claim 11, wherein one or more of the three or more independently decodable regions are made available for display on multiple heterogeneous devices.

15. The method according to claim 11, wherein a selection of a set of the three or more independently decodable regions to be decoded is determined based on an automatic negotiation with a display device associated to said video decoder and configured to display the video data decoded by said video decoder.

16. The method according to claim 11, wherein a selection of a set of the independently decodable regions to be decoded is determined based on a manual selection of the display format on a display device associated to said video decoder by a user performed by means of a remote control device associated to said video decoding device or to said display device.

17. A decoding device for decoding a digital video stream including a three or more independent component regions and configured to read a signal indicating a presence of three or more independently decodable regions, the decoding device comprising:
a signaling decoder configured to read a signalling comprised in said digital video stream indicating an association between the three or more independent component regions and the three or more independently decodable regions and configured to read a descriptor comprised in said digital video stream indicating a type of content of each one of the three or more independently decodable regions, wherein said three or more independent component regions are originated by a plurality of video sources and wherein any of said three or more independent component regions can be associated with any of said three or more independently decodable regions in an independent way,
a video data decoder configured to decode video data comprised in said digital video stream according to a decoding strategy, and
a selecting unit configured to select for decoding by said video data decoder a set of said three or more independently decodable regions indicated by said signalling or by said descriptor,
wherein the video data decoder decodes said set of independently decodable regions selected by the selecting unit, and outputs a decoded digital video stream comprising said set of selected independently decodable regions.

18. The decoding device of claim 17, wherein said selecting unit is further configured to automatically or manually select for display on a display device associated to said decoding device said set of the independently decodable regions decoded by said decoding device.

19. The decoding device according to claim 17, wherein said a selecting unit is further configured to select, by means of a negotiation process with a display device associated to said decoding device, a display format comprising said set of independently decodable regions decoded by said decoding device.

* * * * *